(12) United States Patent
Wang et al.

(10) Patent No.: US 12,183,906 B2
(45) Date of Patent: Dec. 31, 2024

(54) BATTERY MODULE ASSEMBLY, BATTERY PACK, AND DEVICE USING BATTERY AS POWER SOURCE

(71) Applicant: CONTEMPORARY AMPEREX TECHNOLOGY (HONG KONG) LIMITED, Hong Kong (CN)

(72) Inventors: Yongguang Wang, Ningde (CN); Mingdi Xie, Ningde (CN); Zhanyu Sun, Ningde (CN); Haizu Jin, Ningde (CN); Peng Wang, Ningde (CN); Kaijie You, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 842 days.

(21) Appl. No.: 17/162,345

(22) Filed: Jan. 29, 2021

(65) Prior Publication Data

US 2021/0313635 A1 Oct. 7, 2021

Related U.S. Application Data

(63) Continuation of application No. PCT/CN2020/082927, filed on Apr. 2, 2020.

(51) Int. Cl.
*H01M 10/6554* (2014.01)
*H01M 50/166* (2021.01)
*H01M 50/207* (2021.01)

(52) U.S. Cl.
CPC ..... *H01M 10/6554* (2015.04); *H01M 50/166* (2021.01); *H01M 50/207* (2021.01)

(58) Field of Classification Search
CPC .......................... H01M 10/6554; H01M 50/20
See application file for complete search history.

(56) References Cited

U.S. PATENT DOCUMENTS

| 8,795,867 B2 | 8/2014 | Kim |
| 9,887,437 B2 | 2/2018 | Palanchon |

(Continued)

FOREIGN PATENT DOCUMENTS

| CN | 102104122 A | 6/2011 |
| CN | 103229326 A | 7/2013 |

(Continued)

OTHER PUBLICATIONS

"2016-2017 Mechanical Engineering Discipline Development Report (Mechanical Design)", compiled by China Society of Mechanical Engineering, China Science and Technology Press, Mar. 31, 2018, pp. 203-204.

(Continued)

*Primary Examiner* — Barbara L Gilliam
*Assistant Examiner* — Jordan E Berresford
(74) *Attorney, Agent, or Firm* — STERNE, KESSLER, GOLDSTEIN & FOX P.L.L.C.

(57) ABSTRACT

A battery module assembly, a battery pack, and a device using a battery as a power source are provided. The battery module assembly includes: at least two battery modules arranged along a first direction, each of the battery modules including a plurality of battery cells, and a shell side wall of the battery cell including two oppositely arranged first side walls and two oppositely arranged second side walls, an area of the first side wall being larger than that of the second side wall, and the first side wall being perpendicular to the first direction; and a cooling plate arranged between two adjacent battery modules, and configured to perform heat exchange with the first side walls of the battery cells of the two adjacent battery modules. The battery pack includes the battery module assembly. The device using a battery as a power source includes the battery pack.

8 Claims, 7 Drawing Sheets

(56) References Cited

U.S. PATENT DOCUMENTS

| | | | |
|---|---|---|---|
| 11,482,738 B2 | 10/2022 | Jin et al. | |
| 2007/0190409 A1 | 4/2007 | Sakurai | |
| 2014/0062418 A1* | 3/2014 | Lim | H01M 50/242 |
| | | | 320/137 |
| 2016/0329617 A1* | 11/2016 | Omura | H01M 50/209 |
| 2018/0337433 A1 | 11/2018 | Champagne et al. | |
| 2019/0280355 A1* | 9/2019 | Kim | H01M 10/658 |
| 2020/0028201 A1* | 1/2020 | Ahn | H01M 50/262 |

FOREIGN PATENT DOCUMENTS

| | | |
|---|---|---|
| CN | 105789516 A | 7/2016 |
| CN | 107749506 A | 3/2018 |
| CN | 108879016 A | 11/2018 |
| CN | 108879023 A | 11/2018 |
| CN | 209249567 U | 8/2019 |
| CN | 209447945 U | 9/2019 |
| DE | 102013015785 A1 | 3/2015 |
| JP | 2006127938 A | 5/2006 |
| JP | 2012038709 A | 2/2012 |
| JP | 2012160315 A | 8/2012 |
| JP | 2014157721 A | 8/2014 |
| JP | 2020513655 A | 5/2020 |
| WO | 2017042930 A | 3/2017 |

OTHER PUBLICATIONS

"Introduction to New Chemical Power Technology", edited by Li Guoxin, Shanghai Science and Technology Press, May 31, 2007, pp. 150-151.

Extended European Search Report issued in European Application No. 20839210.0, mailed Nov. 16, 2021, 14 pages.

Supplementary Partial European Search Report filed in European Patent Appln. No. 20 83 9210 dated Aug. 13, 2021, 14 pages.

Notice of Reasons for Refusal Japanese Application No. 2022-533518, mailed May 21, 2024, 5 pages.

* cited by examiner

BATTERY MODULE ASSEMBLY, BATTERY PACK, AND DEVICE USING BATTERY AS POWER SOURCE

This application is a continuation of International Application No. PCT/CN2020/082927 filed on Apr. 2, 2020, which is incorporated by reference herein in its entirety.

TECHNICAL FIELD

The present disclosure relates to the field of battery technologies, and more particularly, to a battery module assembly, a battery pack, and a device using a battery as a power source.

BACKGROUND

When a battery pack is working, a suitable ambient temperature is required to ensure the normal operation of a battery cell of the battery pack. Too high or too low ambient temperature may have a negative effect on the working performance and service life of the battery cell. If the ambient temperature is too high and the heat dissipation is not timely enough, thermal runaway may likely occur in the battery cell, which may cause safety accidents and certain potential safety hazards. Therefore, thermal management of the battery pack is required. When the ambient temperature is not suitable, the battery pack may be heated or cooled to control the temperature of the battery cell.

One of the effective methods for thermal management of the battery pack is to install a cooling plate in a case of the battery pack. The circulating liquid coolant is employed to remove heat generated by the battery cell, or the cooling plate is heated to control the temperature of the battery cell. In the related technologies, the battery cell of the battery pack generally is arranged erectly, the cooling plate is arranged on the bottom of the case of the battery pack, and the temperature of the battery cells is controlled by cooling or heating the bottom of the battery cell.

SUMMARY

A first aspect of the present disclosure provides a battery module assembly, which includes:
 at least two battery modules arranged along a first direction, each of the battery modules including a plurality of battery cells, and a shell side wall of the battery cell including two oppositely arranged first side walls and two oppositely arranged second side walls, an area of the first side wall being larger than that of the second side wall, and the first side wall being perpendicular to the first direction; and a cooling plate arranged between two adjacent battery modules to perform heat exchange with the first side walls of the battery cells of the two adjacent battery modules.

In the battery module assembly according to some embodiments, the plurality of battery cells of each of the battery modules are arranged along a direction perpendicular to the first direction.

In the battery module assembly according to some embodiments, the first side wall of the battery cell is connected to the cooling plate.

In the battery module assembly according to some embodiments, the battery cell includes an insulating film arranged on an outer side of the shell side wall of the battery cell. One surface of the insulating film is connected to the first side wall, and another surface of the insulating film is connected to the cooling plate.

In the battery module assembly according to some embodiments, the battery module assembly further includes a thermally conductive adhesive layer arranged between the cooling plate and the first side wall of the battery cell adjacent to the cooling plate.

In the battery module assembly according to some embodiments, a direction in which the battery cell generates a maximum expansion force is substantially parallel to the first direction.

A second aspect of the present disclosure provides a battery pack, which includes:
 a case.

In the battery module assembly according to the first aspect of the present disclosure, the battery module assembly is arranged in the case.

In the battery pack according to some embodiments, the case includes a case side wall surrounding the battery module assembly, and the cooling plate is connected to the case side wall.

In the battery pack according to some embodiments, the battery pack includes at least two said battery module assemblies, and the at least two battery module assemblies are arranged along a second direction perpendicular to the first direction.

In the battery pack according to some embodiments, the two cooling plates corresponding to the two adjacent battery module assemblies are arranged separately.

In the battery pack according to some embodiments, the battery pack includes a connecting portion, and the two cooling plates corresponding to the two adjacent battery module assemblies are connected by the connecting portion.

In the battery pack according to some embodiments, the case includes a separator beam fixedly connected to the case side wall. The separator beam divides internal space of the case into a plurality of subspaces, and the at least two battery module assemblies are respectively arranged in the plurality of subspaces.

In the battery pack according to some embodiments, the case includes a separator beam fixedly connected to the case side wall. The separator beam divides internal space of the case into a plurality of subspaces, the at least two battery module assemblies are respectively arranged in the plurality of subspaces, and the connecting portion is fixedly connected to the separator beam.

In the battery pack according to some embodiments, the case includes a case cover and a case bottom respectively arranged at two ends of the case side wall. The case cover and the case bottom are detachably connected to the case side wall, and the cooling plate is provided integrally with the case side wall.

In the battery pack according to some embodiments, the case includes a case cover and a case bottom respectively arranged at two ends of the case side wall. The case cover and the cooling plate are detachably connected to the case side wall, and the case bottom is provided integrally with the case side wall.

In the battery pack according to some embodiments, the battery pack further includes a cover plate arranged between the case cover and the battery module or between the case bottom and the battery module. The cover plate is detachably connected to the case.

A third aspect of the present disclosure provides a device using a battery as a power source, which includes the battery pack according to the second aspect of the present disclosure.

Other features and advantages of the present disclosure will become apparent from the following detailed description of exemplary embodiments of the present disclosure with reference to accompanying drawings.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

Figure 1:
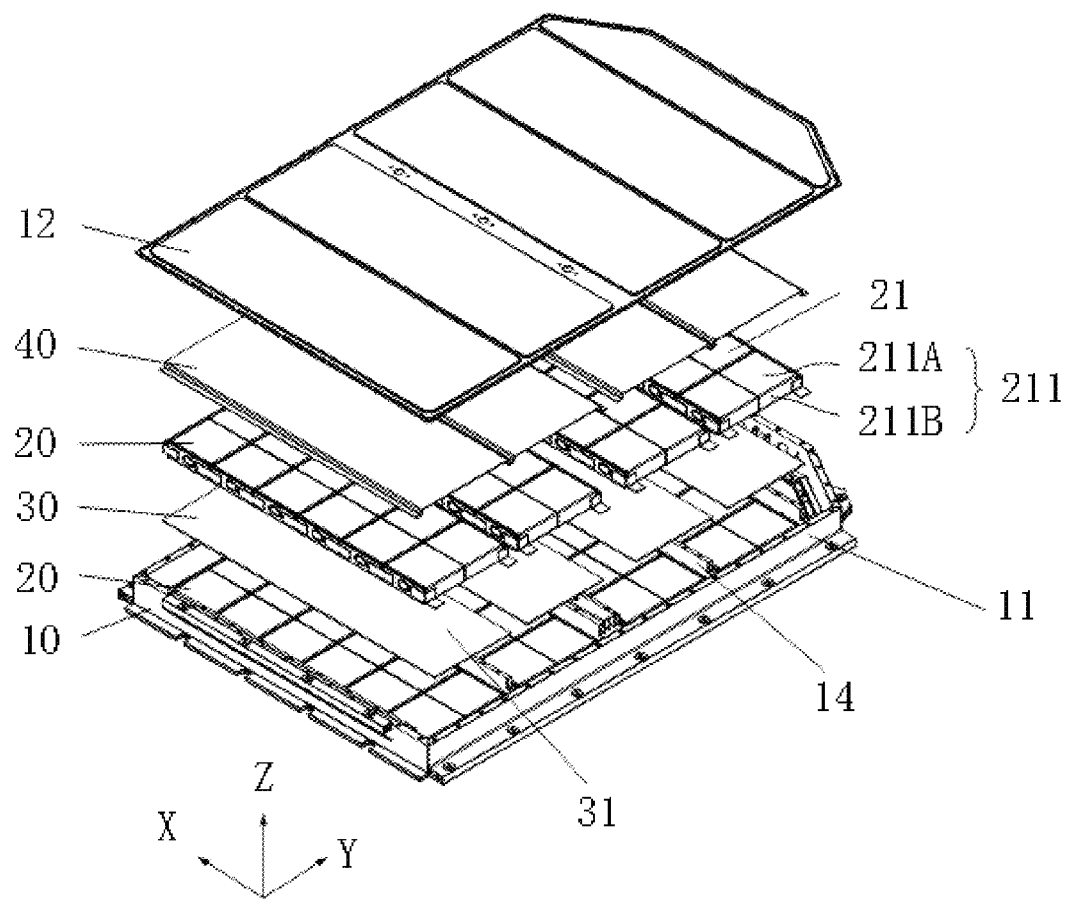
FIG. 1 is a schematic exploded view of a battery pack according to an embodiment of the present disclosure.

Technical solutions in the embodiments of the present disclosure will be described clearly and completely below, in conjunction with the accompanying drawings in the embodiments of the present disclosure. The described embodiments are some but not all of the embodiments of the present disclosure. The following description of at least one exemplary embodiment is illustrative, and in no way serves as any limitation on the present disclosure and application or use thereof. All other embodiments obtained by persons of ordinary skill in the art based on the embodiments of the present disclosure without creative efforts shall fall within the protection scope of the present disclosure.

The relative arrangement, numerical expressions, and numerical values of the components and steps set forth in these embodiments do not limit the scope of the present disclosure unless otherwise specifically stated. Also, it is to be understood that for the ease of description, sizes of parts as shown in the accompanying drawings are not drawn according to an actual proportional relation. Technologies, methods and equipment known to those of ordinary skill in the related art may not be discussed in detail, but where appropriate, the technologies, methods and equipment should be considered as part of the authorized specification. In all examples shown and discussed herein, any specific values should be interpreted as exemplary and not limiting. Therefore, other examples of the exemplary embodiment may have different values. It is to be noted that similar reference numerals and letters indicate similar items in the following accompanying drawings. Therefore, once an item is defined in one drawing, there is no need to discuss this item further in subsequent drawings.

In the description of the present disclosure, it is to be understood that the use of "first", "second" and other terms to limit parts, is only to facilitate the distinction between the corresponding parts. If not otherwise stated, the above terms have no special meaning, and therefore cannot be interpreted as restrictions on the protection scope of the present disclosure.

In the description of the present disclosure, it is to be understood that positions or positional relationships indicated by the position words such as "front, rear, upper, lower, left, right", "transverse, vertical, perpendicular, horizontal" and "top, bottom" are generally based on the positions or positional relationships as shown in the accompanying drawings, and are merely for ease of a description of the present disclosure and a simplified description. Unless otherwise stated, these position words are not intended to indicate or imply the device or element to have a special position or to be configured and operated in a special position. Thus, these position words cannot be interpreted as restrictions on the protection scope of the present disclosure. The position words "inside, outside" refer to inside or outside the contours of the parts themselves.

In the process of finding the present disclosure, it is found that in the related technologies, due to a smaller bottom area of a battery cell, a cooling plate has a low heat dissipation efficiency, a temperature control effect is not ideal, and the temperature control effect is not balanced.

Embodiments of the present disclosure provide a battery module assembly, a battery pack, and a device using a battery as a power source.

The device using a battery as a power source provided by the embodiments of the present disclosure includes the battery pack according to the embodiments of the present disclosure. The device may be, for example, a vehicle, a ship, or an energy storage device, etc. The device using a battery as a power source provided by the embodiments of the present disclosure has the advantages of the battery pack according to the embodiments of the present disclosure.

Figure 2:
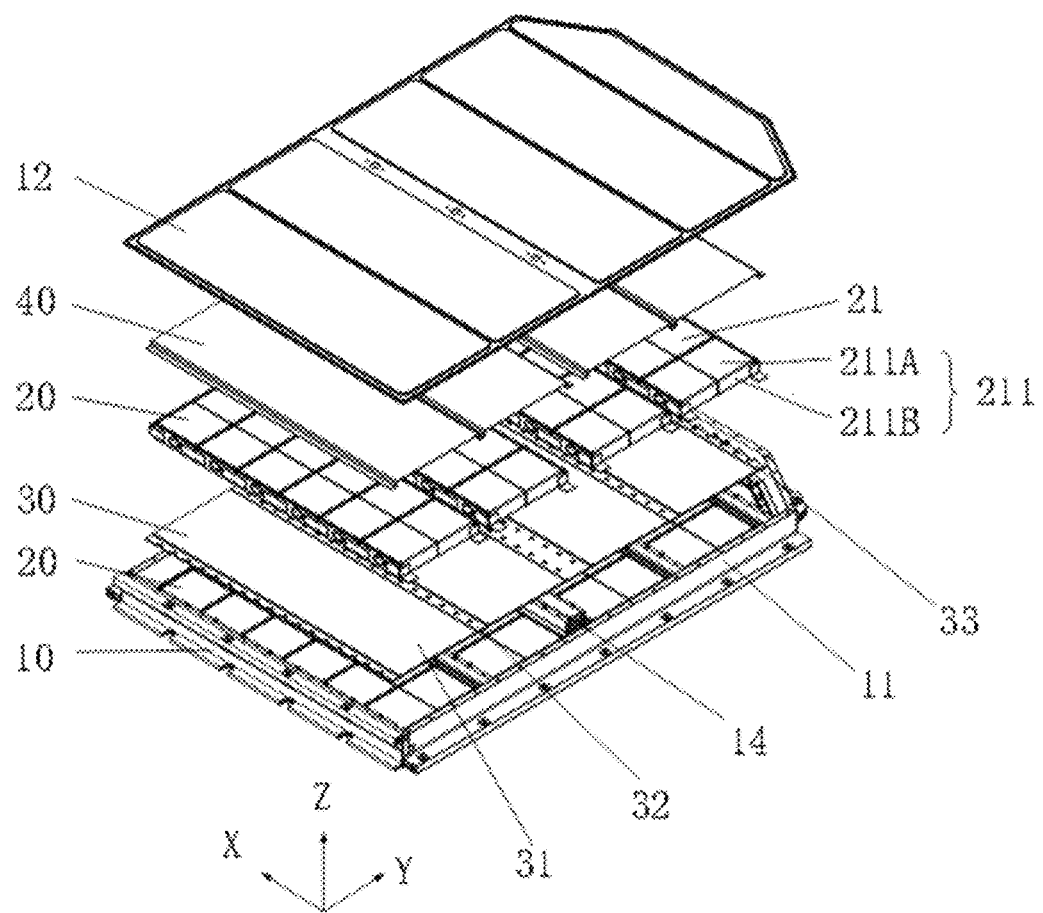
FIG. 2 is a schematic exploded view of a battery pack according to another embodiment of the present disclosure.
Figure 3:
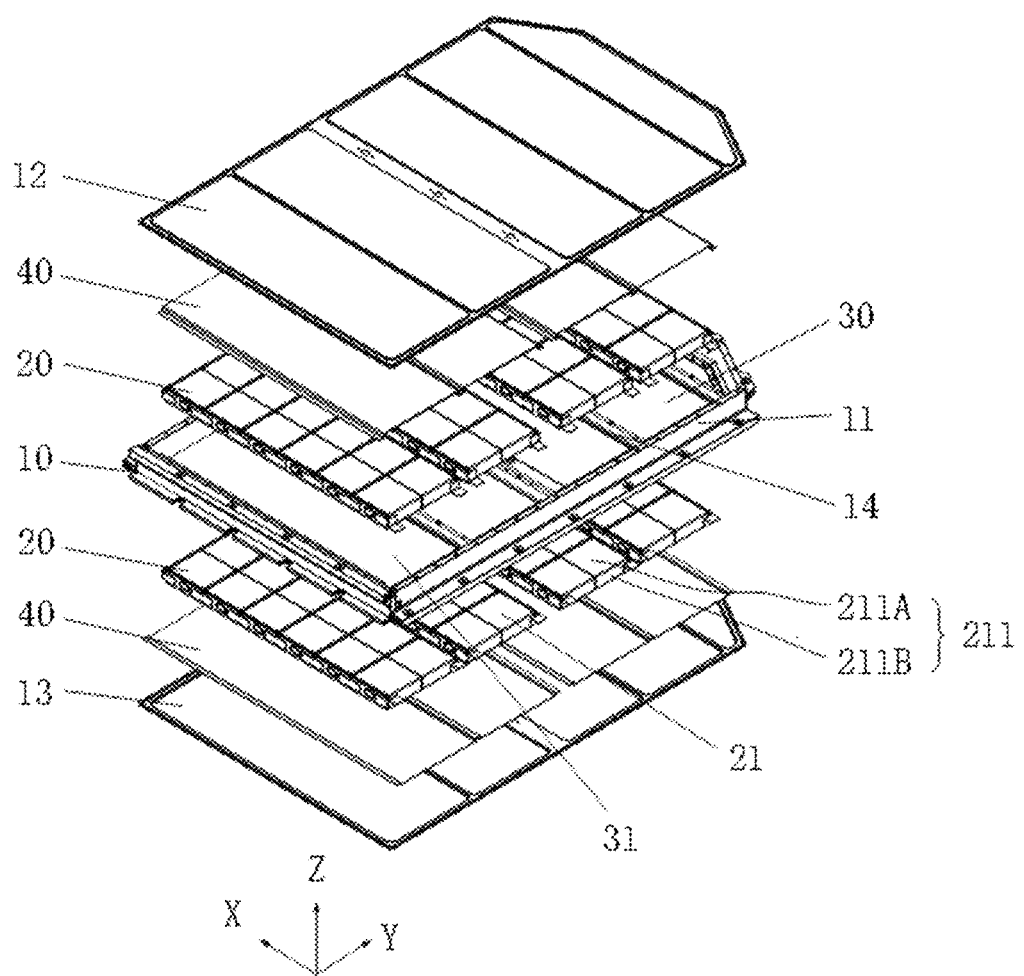
FIG. 3 is a schematic exploded view of a battery pack according to still another embodiment of the present disclosure.
Figure 4A:
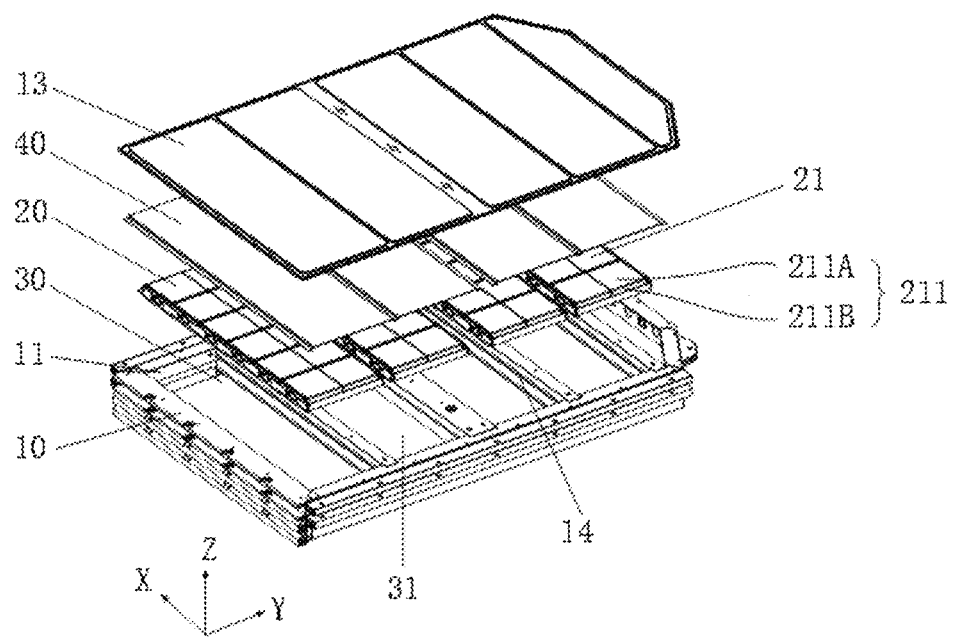
FIG. 4A-FIG. 4D are schematic structural diagrams of the battery pack as shown in FIG. 3 in different assembly stages.
Figure 4B:
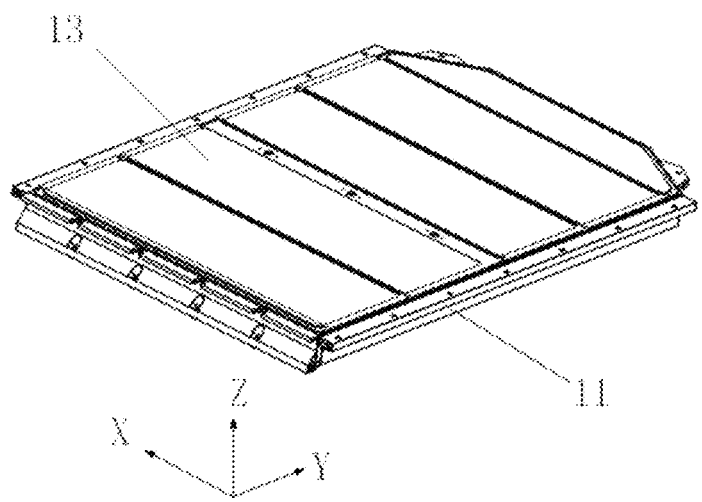
Figure 4C:
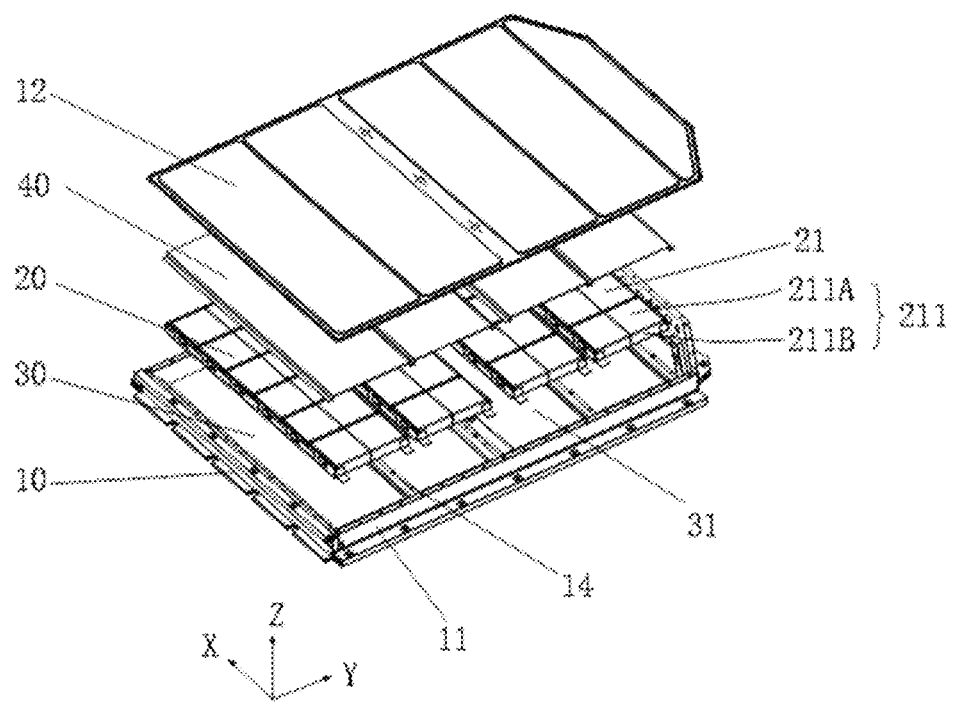
Figure 4D:
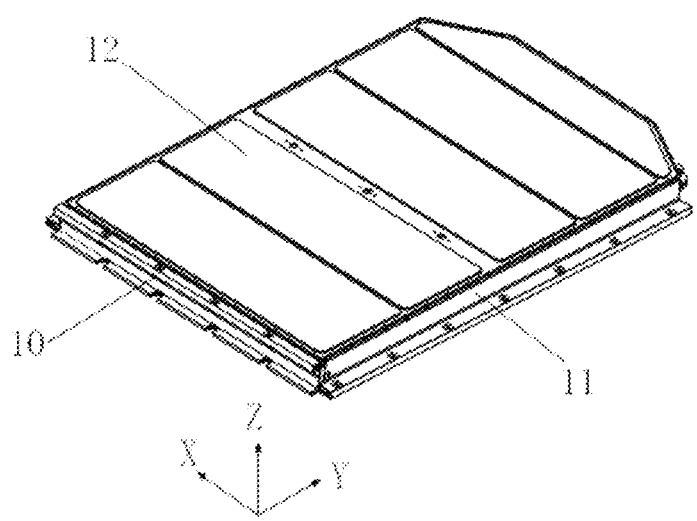

As shown in FIG. 1 to FIG. 3, the battery pack provided by the embodiments of the present disclosure mainly includes a case 10 and a battery module assembly arranged in the case 10. The battery pack according to the embodiments of the present disclosure has the advantages of the battery module assembly according to the embodiments of the present disclosure.

As shown in FIG. 1 to FIG. 3 and FIG. 4A to FIG. 4D, the battery module assembly provided by the embodiments of the present disclosure includes at least two battery modules 20 and a cooling plate 31. The at least two battery modules 20 are arranged along a first direction Z, each of the battery modules 20 includes a plurality of battery cells 21, and a shell side wall 211 of the battery cell 21 includes two oppositely arranged first side walls 211A and two oppositely arranged second side walls 211B. An area of the first side wall 211A is larger than that of the second side wall 211B, and the first side wall 211A is perpendicular to the first direction Z. The cooling plate 31 is arranged between two adjacent battery modules 20, and is configured to perform heat exchange with the first side walls 211A of the battery cells 21 of the two adjacent battery modules 20.

In the battery module assembly according to the embodiments of the present disclosure, a cooling plate 31 is provided between two adjacent battery modules 20, such that the two battery modules 20 share this cooling plate 31, and the cooling plate 31 is arranged between the two adjacent battery modules 20 to perform heat exchange with the first side wall 211A of the battery cell 21 having a larger area. The battery cell 21 forms the battery module 20 in a flat manner, and the cooling plate cools or heats the maximum surface of the battery cell 2, such that the efficiency of cooling or heating the battery cell 21 is improved. The cooling plate 31 is arranged between two adjacent battery modules 20, which is beneficial to reduce or prevent uneven heating or cooling of the two adjacent battery modules 20.

In the battery module assembly according to some embodiments, the plurality of battery cells 21 of each of the battery modules 20 are arranged along a direction perpendicular to the first direction Z. In FIG. 1 to FIG. 4D, the first direction Z corresponds to the height direction of the battery pack. In this arrangement mode, the battery modules 20 in the battery module assembly are arranged in a single layer, which facilitates evenly heating or cooling the battery cells 21 in the battery modules 20.

In the battery module assembly according to some embodiments, the first side wall 211A of the battery cell 21 is connected to the cooling plate 31. The battery cell 21 is connected to the cooling plate 31 through the first side wall 211A, which facilitates major components of the battery module assembly to form a whole. When the battery module assembly is assembled with other parts of the battery pack such as the case, a liquid coolant delivery pipeline and other battery module assemblies, it is helpful to quickly locate and assemble the battery module assembly, thereby helping to improve the assembly efficiency of the battery pack.

Figure 5:
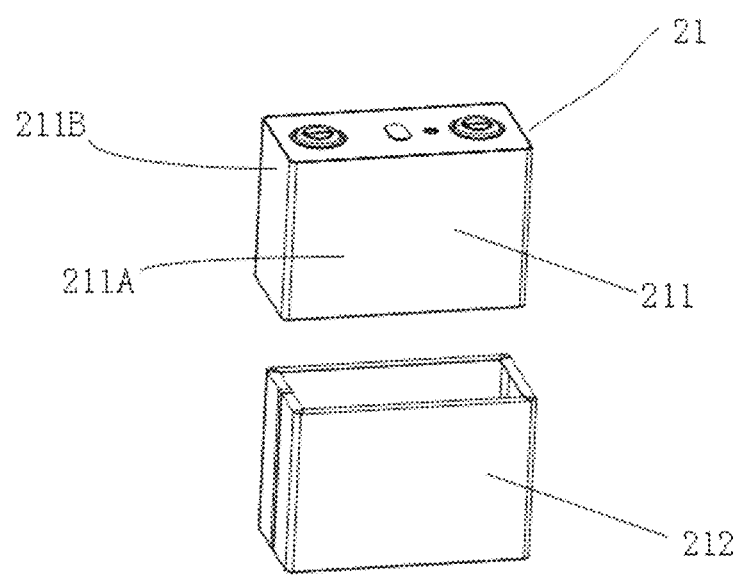
FIG. 5 is a schematic structural diagram of a battery cell of a battery module assembly according to some embodiments of the present disclosure.

In the battery module assembly according to some embodiments, the battery cell 21 includes an insulating film 212. The battery cell 21 including the insulating film 212 is as shown in FIG. 5. In the event that the battery cell 21 includes the insulating film 212, the insulating film 212 is arranged on an outer side of the shell side wall 211 of the battery cell 21, one surface of the insulating film 212 is connected to the first side wall 211A, and another surface of the insulating film is connected to the cooling plate 31. The insulating film 212 facilitates providing electrical protection for the battery cell 21 and the cooling plate 31.

In the battery module assembly according to some embodiments, the battery module assembly further includes a thermally conductive adhesive layer arranged between the cooling plate 31 and the first side wall 211A of the battery cell 21 adjacent to the cooling plate 31. The arrangement of the thermally conductive adhesive layer can fix the cooling plate 31 and the battery cell 21, and facilitates heat transfer between the cooling plate 31 and the battery cell 21.

Figure 6:
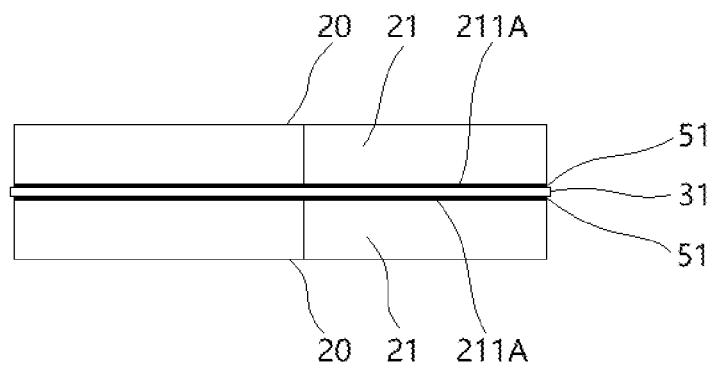
FIG. 6 is a schematic structural diagram of a cooling plate arranged between two adjacent battery modules of a battery pack according to an embodiment of the present disclosure.

For example, as shown in FIG. 6, for the battery cell 21 without an insulating layer, the thermally conductive adhesive layer 51 is respectively adhered to the cooling plate 31 and the first side wall 211A of the battery cell 21 facing to the cooling plate 31, the cooling plate 31 and the corresponding first side wall 211A are fixed together, and the thermally conductive adhesive layer 51 assumes the function of heat transfer between the cooling plate 31 and the first side wall 211A.

For another example, for the battery cell 21 with the insulating layer 212, the thermally conductive adhesive layer is respectively adhered to the cooling plate 31 and a surface of the insulating layer 212 facing to the cooling plate 31 to fix the cooling plate 31 and the surface of the corresponding insulating layer 312 together. Furthermore, the thermally conductive adhesive layer assumes the function of heat transfer between the cooling plate 31 and the surface of the insulating layer 212. The connection and heat transfer between the first side wall 211A of the battery cell 21 facing to the cooling plate 31 and the cooling plate 31 are implemented through the corresponding part of the insulating layer 212.

In the battery module assembly according to some embodiments, a direction in which the battery cell 21 generates a maximum expansion force is substantially parallel to the first direction Z. The cooling plate 31 is arranged between two adjacent battery modules 20 and the direction of the cooling plate 31 is substantially perpendicular to the first direction Z, therefore, the cooling plate 31 can also at least partially assume the function of resisting deformation of the battery cell 21.

In the battery pack according to some embodiments, the case 10 includes a case side wall 11 surrounding the battery module assembly, and the cooling plate 31 is connected to the case side wall 11. The battery pack has the advantages of the aforementioned battery module assembly. On this basis, since the cooling plate 31 is connected to the case side wall 11, it is beneficial to prevent the cooling plate 31 from translocating with respect to the case 10, thereby facilitating the cooling plate 31 to maintain its relative position with respect to the battery module 20. It is also beneficial to prevent faults such as loose connection, breakage or leakage between the cooling plate 31 and pipe fittings connected to the cooling plate 31.

The battery pack according to some embodiments includes at least two battery module assemblies, and the at least two battery module assemblies are arranged along a direction perpendicular to the first direction Z. The battery pack includes at least two battery module assemblies, and a plurality of battery module assemblies may be integrated into the same case 10. The cooling plate 31 of each battery module assembly constitutes a cooling portion of a cooling plate assembly 30 of the battery pack.

In the battery pack according to some embodiments, two cooling plates 31 corresponding to the two adjacent battery module assemblies are arranged separately. Two adjacent cooling plates 31 are arranged separately, such that the cooling plates 31 of each battery module assembly are less mutually restricted when the battery pack is assembled, and thus the assembly process is more flexible. When two adjacent battery module assemblies each include only two battery modules 20 and a single cooling plate 31 arranged between the two battery modules 20, the two corresponding cooling plates 31 refer to the two cooling plates 31 of the two battery modules. In the event that two adjacent battery module assemblies each include at least three battery modules 20 and at least two cooling plates 31, the two cooling plates 31 arranged correspondingly refer to one cooling plate 31 of one battery module assembly and a cooling plate 31 adjacent to this cooling plate 31 among the cooling plates 31 of another battery module assembly.

The battery pack according to some embodiments includes a connecting portion 32, and the two cooling plates 31 corresponding to the two adjacent battery module assemblies are connected by the connecting portion 32. At least two cooling plates 31 may be connected together by the connecting portion 32, which facilitates positioning of each cooling plate 31 and improves the assembly efficiency.

In the battery pack according to some embodiments, the case 10 includes a separator beam 14. The separator beam 14 is fixedly connected to the case side wall 11, and divides internal space of the case 10 into a plurality of subspaces. The at least two battery module assemblies are respectively arranged in the plurality of subspaces. The arrangement of the separator beam 14 is beneficial to improve the overall rigidity of the battery pack, and also is beneficial to the positioning and installation of each battery module assembly in the battery pack.

In the battery pack according to some embodiments, the connecting portion 32 is fixedly connected to the separator beam 14. The connecting portion 32 is fixedly connected to the separator beam 14, which facilitates the positioning and fixation of the cooling plate 31 and other parts of the battery pack.

In the battery pack according to some embodiments, the case 10 includes a case cover 12 and a case bottom 13 respectively arranged at two ends of the case side wall 11. The case cover 12 and the case bottom 13 are detachably connected to the case side wall 11, and the cooling plate 31 is provided integrally with the case side wall 11. The cooling plate assembly 30 and the case side wall may be integrally designed, which is beneficial to simplify the connection structure between an internal flow channel and an external flow channel of the cooling plate assembly 30, such that the reliability of a cooling device inclusive of the cooling plate assembly 30 can be improved, and the assembly of the battery pack is more convenient.

In the battery pack according to some embodiments, the case 10 includes a case cover 12 and a case bottom respectively arranged at two ends of the case side wall 11, the case cover 12 and the cooling plate 31 are detachably connected to the case side wall 11, and the case bottom is provided integrally with the case side wall 11. This arrangement facilitates single-sided assembly when the battery pack is assembled.

The battery pack according to some embodiments further includes a cover plate 40, which is arranged between the case cover 12 and the battery module 20 or between the case bottom 13 and the battery module 20, and the cover plate 40 is detachably connected to the case 10. The arrangement of the cover plate 40 is advantageous to reduce the expansion of the battery cell and improve the overall rigidity of the battery pack.

The embodiments of the present disclosure are described in more detail below with reference to FIG. 1 to FIG. 3 and FIG. 4A to FIG. 4D. In the embodiments as shown in FIG. 1 to FIG. 4D, the first direction Z is the height direction of the battery pack, the second direction X is the width direction of the battery pack, and the third direction Y is the length direction of the battery pack.

As shown in FIG. 1, the battery pack includes a case 10, battery module assemblies, and a cover plate 40.

The case 10 includes a case side wall 11 extending in the first direction Z, a case cover 12 and a case bottom respectively arranged on two ends of the case side wall 11 along the first direction Z, and a plurality of separator beams 14 arranged in the case 10. The case bottom in FIG. 1 is not shown because it is shielded by the battery module 20 in the lower layer.

As shown in FIG. 1, the battery module assembly mainly includes two battery modules 20 and a cooling plate 31. The two battery modules 20 are arranged along the first direction Z. Each of the battery modules 20 includes a plurality of battery cells 21, and a shell side wall 211 of the battery cell 21 includes two oppositely arranged first side walls 211A and two oppositely arranged second side walls 211B. An area of the first side wall 211A is larger than that of the second side wall 211B, and the first side wall 211A is perpendicular to the first direction Z. The cooling plate 31 is arranged between two adjacent battery modules 20, and is configured to perform heat exchange with the first side walls 211A of the battery cells 21 of the two adjacent battery modules 20.

As shown in FIG. 1, four battery module assemblies are positioned in the case 10 and are arranged along the third direction Y. The first side wall 211A of each battery cell 21 extends in a direction perpendicular to the first direction Z, such that each battery cell 21 is arranged in a flat manner for forming the battery module 20.

In this embodiment, a plurality of battery cells 21 of each battery module 20 are arranged along a direction perpendicular to the first direction Z. As shown in FIG. 1, twelve battery cells 21 are arranged in six rows along the second direction X and are arranged in two columns along the third direction Y. The battery module 20 only includes one layer of battery cell 21 along the first direction Z, which is beneficial to reduce or prevent uneven heating or cooling of each battery cell 21.

The cooling plate 31 of each battery module assembly serves as the cooling portion of the battery module 20 to constitute the cooling plate assembly 30 of the battery pack. The cooling plate 31 cools two adjacent battery modules 20 at the same time by cooling the first side walls 211A of the battery cells 21 of the two adjacent battery modules 20 in the first direction Z. As shown in FIG. 1, the cooling plate assembly 30 and each cooling plate 31 thereof are arranged perpendicular to the first direction Z.

In the battery pack according to some embodiments of the present disclosure, a cooling plate 31 is provided between two adjacent battery modules 20, such that the two battery modules 20 share this cooling plate 31. The cooling plate 31 is arranged between the two adjacent battery modules 20 to perform heat exchange with the first side wall 211A of the battery cell 21 having a larger area so as to cool or heat the maximum surface of the battery cell 2, such that the efficiency of cooling or heating the battery cell 21 is improved. The cooling plate 31 is arranged between two adjacent battery modules 20 along the first direction, which is beneficial to reduce or prevent uneven heating or cooling of the two adjacent battery modules 20.

The cooling plate 31 may be made of a thermally conductive material with a certain strength, for example, metal such as aluminum, steel, or copper. The cooling plate 31 is internally provided with an internal flow channel through which the liquid coolant flows. The cooling plate 31 allows the liquid coolant flowing through the internal flow channel to exchange heat with the first side walls 211A of the battery cells on two sides of the cooling plate 31. In this way, the temperature adjustment of the battery cells 21 is achieved.

The case cover 12 is detachably connected to the case side wall 11, and the case bottom is provided integrally with the case side wall 11. This arrangement facilitates the assembly of the battery pack on a single side of the case 10.

The first direction Z is the up-down direction in FIG. 1, the case cover 12 is detachably arranged at an upper end of the case side wall 11, and the case bottom is positioned at a lower end of the case side wall 11. The case bottom is provided integrally with the case side wall 11. The case side wall 11, the case cover 12 and the case bottom encircle the internal space accommodating two layers of battery modules 20 of a plurality of battery module assemblies, the cooling plate assembly 30 constituted by cooling plates 31 of a plurality of battery module assemblies, and the cover plate 40.

The separator beam 14 extends in the second direction X (i.e., the width direction of the battery pack). A plurality of separator beams 14 divide the internal space of the case 10 into a plurality of subspaces. The battery module assemblies are respectively arranged in different subspaces. The separator beam 14 is fixedly connected to the case side wall 11 and the case bottom.

As shown in FIG. 1, the case 10 includes five separator beams 14 extending in the width direction. The five separator beams 14 divide the internal space of the case 10 into four subspaces arranged side by side along the third direction Y. Two separator beams 14 positioned at two ends along the third direction Y are adjacent to the case side wall 11 on the corresponding side. The four battery modules 20 of battery module assemblies are respectively positioned in four subspaces.

In an embodiment not shown, more or fewer separator beams may be arranged, and the separator beams may be arranged along the length direction of the battery pack, or the case may include separator beams extending in the length direction and separator beams extending in the width direction. The number and location of the battery module assemblies, the number of the battery modules 20 included in each battery module assembly, and the number and arrangement of the battery cells 21 included in each of the battery modules 20 may be set correspondingly based on the subspaces divided by the separator beams.

The structures of the plurality of separator beams extending in the same direction or in different directions may be the same or may be different. In the embodiment as shown in FIG. 1, among the five separator beams 14, the separator beam 14 in the middle is different from the other separator beams 14 in structure. The width (along the third direction Y) of the separator beam 14 in the middle is larger than that of the other separator beams 14.

As shown in FIG. 1, the four cooling plates 31 of the four battery module assemblies are arranged side by side and spaced apart. That is, the cooling plate assembly 30 has a split structure.

In this embodiment, the battery module assembly includes a thermally conductive adhesive layer 51, which is filled between the cooling plate 31 and the first side wall 211A of the battery module 20 adjacent to the cooling plate 31. The thermally conductive adhesive layer 51 is filled between the cooling plate 31 and the first side wall 211A of the adjacent battery module 20, which facilitates the relatively fixed position between the cooling plate 31 and the battery module 20, and also facilitates the heat transfer between the cooling plate 31 and the battery module 20.

The cover plate 40 is positioned between the case cover 12 and the upper battery modules 20 and is detachably connected to the case 10. As shown in FIG. 1, the cover plate 40 includes two covers arranged at intervals along the third direction Y. Each cover covers the battery modules 20 of two adjacent battery module assemblies. Two ends of the cover along the third direction Y are respectively fixedly connected to the corresponding separator beams 14. The middle of the cover along the third direction Y is provided with a groove recessed toward the separator beam 14, and the bottom of the groove is fixedly connected to the corresponding separator beam 14. The fixed connection between the cover and the separator beam 14 may be, for example, a screw connection, a rivet connection, spot welding, and so on.

A feasible assembly process for assembling the battery pack of the embodiment shown in FIG. 1 is as follows.

The four battery modules 20 on the lower layer of battery module assemblies are first installed in subspaces of the case 10 respectively, and the lower first side walls 211A of the four battery modules 20 are fixed onto the bottom of the case 10 by way of bonding. Next, the cooling plates 31 are adhered to the upper first side walls 211A of the four battery modules 20 among battery modules 20 on the lower layer with a thermally conductive adhesive, and the thermally conductive adhesive forms a thermally conductive adhesive layer. Pipe fittings that need to be connected to the cooling plates 31 are installed. Next, the thermally conductive adhesive is applied onto the upper surfaces of the cooling plates 31, and the four battery modules 20 on the upper layer of battery module assemblies are installed in subspaces of the case 10 and are firmly adhered to the upper surfaces of the cooling plates 31 respectively, and the thermally conductive adhesive forms a thermally conductive adhesive layer. Next, the cover plate 40 is placed on battery modules 20 on the upper layer and is fixedly connected to the separator beam 14. Finally, the case cover 12 is placed and the case cover 12 is connected to the upper end of the case side wall 11. In this way, the assembly process of the battery pack is completed.

The difference between the embodiment as shown in FIG. 2 and the embodiment as shown in FIG. 1 is that, in FIG. 2, the battery pack further includes three connecting portions 32, and each connecting portion 32 connects two adjacent cooling plates 31, such that the cooling plates 31 of each battery module assembly is connected by the connecting portion 32 to form a cooling plate assembly 30 having an integral structure. For example, the connecting portion 32 may be in the shape of a flat plate, or the connecting portion may be adapted to the spatial shape of the corresponding structure in the case. For example, a part of the structure of the connecting portion may be designed as a groove structure adapted to the shape of the separator beam 14 to avoid the separator beam 14.

As shown in FIG. 2, the connecting portion 32 is fixedly connected to the separator beam 14 to connect the cooling plate assembly 30 to the separator beam 14. In this embodiment, on each connecting portion 32 and separator beam 14 there are correspondingly provided with mounting holes, and each connecting portion 32 may be detachably connected to the corresponding separator beam 14 by screws. In addition, two ends of the cooling plate assembly 30 along the third direction Y are also provided with a mounting portion 33 connected to the edge of the corresponding cooling plate 31, and the mounting portion 33 is connected to the corresponding separator beam 14 by screws.

By connecting the connecting portion 32 to the separator beam 14, the cooling plate assembly 30 may be connected to the separator beam 14. In this way, the positioning and fixation of the cooling plate assembly 30 are achieved, which is advantageous to improve the overall strength of the cooling plate assembly 30 and the battery pack.

A feasible assembly process for assembling the battery pack of the embodiment shown in FIG. 2 is as follows.

The four battery modules 20 on the lower layer of battery module assemblies are first installed in subspaces of the case 10 respectively, and the lower first side walls 211A of the four battery modules 20 are fixed onto the case bottom of the case 10 by means of bonding. Next, the cooling plates 31 of battery module assemblies are adhered to the upper first side walls 211A of the four battery modules 20 on the lower layer with a thermally conductive adhesive, and the thermally conductive adhesive forms a thermally conductive adhesive layer. Each connecting portion 32 and each mounting portion 33 are connected to the corresponding separator beam 14 by screws. Pipe fittings that need to be connected to each cooling plate 31 are installed. Next, the thermally conductive adhesive is applied onto the upper surfaces of the cooling plates 31, and the four battery modules 20 on the upper layer are installed in subspaces of the case 10 and are firmly adhered to the upper surfaces of the cooling plates 31 respectively, and the thermally conductive adhesive forms a thermally conductive adhesive layer. Next, the cover plate 40 is placed on battery modules 20 on the upper layer and is fixedly connected to the separator beam 14. Finally, the case cover 12 is placed and the case cover 12 is connected to the upper end of the case side wall 11 to complete the assembly process of the battery pack.

Reference may be made to the previous related descriptions for other parts, functions of the parts, and positional relationships between the parts that are not described in the embodiment as shown in FIG. 2.

The embodiments as shown in FIG. 3 and FIG. 4A to FIG. 4D are different from the embodiments as shown in FIG. 1 and FIG. 2 in that the case cover 12 and the case bottom 13 are detachably connected to the case side wall 11, and the cooling plate assembly 30 including the cooling plate 31 of each battery module assembly is integrally arranged with the case side wall 11. The cooling plate assembly 30 is positioned in the middle of the case side wall 11 along the first direction Z, and the four cooling plates 31 of the cooling plate assembly 30 are respectively positioned in each subspace and are fixedly connected to the separator beams 14 at two ends along the third direction Y.

The cooling plate assembly 30 and the case side wall 11 may be integrally designed, which is beneficial to simplify the connection structure between the internal flow channel of the cooling plate assembly 30 and the external flow channel, such that the reliability of the cooling device including the cooling plate assembly 30 may be improved, and thus the assembly of the battery pack is more convenient.

As shown in FIG. 4A to FIG. 4D, a feasible assembly process for assembling the battery pack of the embodiment as shown in FIG. 3 is as follows.

Parts at one end of the cooling plate assembly 30 along the first direction Z are first assembled to form an intermediate assembly, then the intermediate assembly is turned over, and parts at another end along the first direction Z are assembled. In this way, the battery pack is successfully assembled.

Hereinafter, the assembly of the parts under the cooling plate assembly 30 is taken as an example to describe the assembly process of the battery pack.

The end where the case side wall 11 is connected to the case bottom 13 faces up, and one battery module 20 (after the assembly is completed, battery modules 20 on the lower layer are formed) is selected from each of the four battery module assemblies and is adhered to the cooling plate 31 in each subspace of the case 10 with thermally conductive adhesive. Next, a cover plate 40 is placed on the battery modules 20 on the lower layer and is fixedly connected to the separator beam 14. The case bottom 13 is covered and is connected to the case side wall 11, such that the intermediate assembly is assembled and formed. The intermediate assembly is turned over until the end where the case side wall 11 is connected to the case cover 12 faces up, and other four battery modules 20 (after the assembly is completed, battery modules 20 on the upper layer are formed) of the four battery module assemblies are adhered to the cooling plates 31 in subspaces of the case 10 with thermally conductive adhesive, and the thermally conductive adhesive forms a thermally conductive adhesive layer. Next, another cover plate 40 is placed on the battery module 20 on the upper layer and is fixedly connected to the separator beam 14. Finally, the case cover 12 is placed and the case cover 12 is connected to the case side wall 11. In this way, the assembly process of the battery pack is completed.

Reference may be made to the previous related descriptions for other parts, functions of the parts, and positional relationships between the parts that are not described in the embodiments as shown in FIG. 3 and FIG. 4A to FIG. 4D.

FIG. 5 illustrates a battery cell in an alternative embodiment of the battery pack and battery cells of battery module assemblies of the battery pack in embodiments as shown in FIG. 1 to FIG. 4A to FIG. 4D. As shown in FIG. 5, the difference between the battery cell 21 in this embodiment and the battery cell in the previous embodiment resides in that an insulating film 212 is arranged on an outer periphery of a battery side wall 211 of the battery cell. The battery cell 21 in the embodiment as shown in FIG. 5 may be used to replace the battery cell 21 in any one of the foregoing embodiments to form another embodiment.

The insulating film 212 facilitates providing electrical protection for the battery cell 21 and the cooling plate 31.

Finally, it should be noted that the foregoing embodiments are merely intended for describing the technical solutions of the present disclosure, but not for limiting the present disclosure. Although the present disclosure is described in detail with reference to the preferred embodiments, persons of ordinary skill in the art should understand that they may still make modifications to the specific embodiments of the present disclosure or make equivalent replacements to some technical features, which shall fall within the scope of the technical solutions claimed in the present disclosure.

What is claimed is:

1. A battery pack, comprising:
  a case;
  at least two battery module assemblies arranged in the case, each battery module assembly comprising:
    at least two battery modules arranged along a first direction, each of the battery modules comprising a plurality of battery cells, and a shell side wall of a battery cell comprising two oppositely arranged first side walls and two oppositely arranged second side walls, wherein an area of a first side wall is larger than that of a second side wall, and wherein the first side wall is perpendicular to the first direction; and
    a cooling plate arranged between two adjacent battery modules to perform heat exchange with the first side walls of the battery cells of the two adjacent battery modules,
  wherein the at least two battery module assemblies are arranged along a direction perpendicular to the first direction; and
  a connecting portion, disposed between and connecting two cooling plates corresponding to two adjacent battery module assemblies such that the cooling plates are connected by the connecting portion to form a cooling plate assembly having an integral structure,
  wherein the case comprises a separator beam fixedly connected to a case side wall and dividing internal space of the case into a plurality of subspaces,
  wherein the at least two battery module assemblies are respectively arranged in the plurality of subspaces,
  wherein the connecting portion is fixedly connected to the separator beam,
  wherein the case comprises a case cover and a case bottom respectively arranged at two ends of the case side wall along the first direction,
  wherein the case cover and the case bottom are detachably connected to the case side wall, and
  wherein the cooling plate assembly is positioned in the middle of the case side wall along the first direction, such that the cooling plate assembly, the case side wall, and the case cover form a space for accommodating battery modules on an upper layer, and the cooling plate assembly, the case side wall, and the case bottom form a space for accommodating the battery modules on a lower layer.

2. The battery pack according to claim 1, wherein the plurality of battery cells of each of the battery modules are arranged along a direction perpendicular to the first direction.

3. The battery pack according to claim 1, wherein the first side wall of the battery cell is connected to the cooling plate.

4. The battery pack according to claim 1, wherein the battery cell comprises an insulating film,
- wherein the insulating film is arranged on an outer side of the shell side wall of the battery cell,
- wherein one surface of the insulating film is connected to the first side wall, and
- wherein another surface of the insulating film is connected to the cooling plate.

5. The battery pack according to claim 1, further comprising a thermally conductive adhesive layer arranged between the cooling plate and the first side wall of the battery cell adjacent to the cooling plate.

6. The battery pack according to claim 1, wherein a direction in which the battery cell generates a maximum expansion force is parallel to the first direction.

7. The battery pack according to claim 1, further comprising a cover plate,
- wherein the case comprises a case cover and a case bottom respectively arranged at two ends of the case side wall, and
- wherein the cover plate is arranged between the case cover and the battery module or between the case bottom and the battery module.

8. A device using a battery as a power source, comprising the battery pack according to claim 1.

\* \* \* \* \*